United States Patent [19]
Moody, Jr. et al.

[11] 3,918,838
[45] Nov. 11, 1975

[54] METAL REINFORCED PLASTIC HELICAL SCREW COMPRESSOR ROTOR

[75] Inventors: Harold W. Moody, Jr., Farmington; Clifford T. Bulkley, Glastonbury, both of Conn.

[73] Assignee: Dunham-Bush, Inc., West Hartford, Conn.

[22] Filed: Jan. 4, 1974

[21] Appl. No.: 430,841

[52] U.S. Cl. ............... 416/176; 416/229; 416/241
[51] Int. Cl.² ......................................... F04D 29/32
[58] Field of Search ....... 416/176, 229, 241 A, 230, 416/224

[56] References Cited
UNITED STATES PATENTS

| | | | |
|---|---|---|---|
| 2,077,959 | 4/1937 | Smith | 416/224 |
| 2,498,348 | 2/1950 | Thompson | 416/230 |
| 2,728,401 | 12/1955 | Brannon | 416/176 |
| 3,280,963 | 10/1966 | Kirker | 416/176 X |
| 3,307,683 | 3/1967 | Pleasants | 416/176 X |
| 3,452,843 | 7/1969 | Smith | 416/229 X |
| 3,456,317 | 7/1969 | Fritsch | 416/176 X |
| 3,659,471 | 5/1972 | Marsch | 416/241 A X |

FOREIGN PATENTS OR APPLICATIONS

| | | | |
|---|---|---|---|
| 1,355,427 | 2/1964 | France | 416/229 |
| 317,371 | 12/1919 | Germany | 416/176 |
| 288,544 | 5/1953 | Switzerland | 416/176 |

Primary Examiner—Everette A. Powell, Jr.
Attorney, Agent, or Firm—Sughrue, Rothwell, Mion, Zinn & Macpeak

[57] ABSTRACT

Metal plates whose periphery is configured generally to that of a finished helical screw compressor rotor are fixedly stacked on a rotor shaft at axially spaced positions to form a metal skeleton of a finished rotor, and a unitary rotor is completed by molding a plastic jacket between the plates around the shaft and about the periphery thereof.

18 Claims, 4 Drawing Figures

METAL REINFORCED PLASTIC HELICAL SCREW COMPRESSOR ROTOR

BACKGROUND OF THE INVENTION

1. Field of the Invention

This invention relates to helical screw compressor rotor particularly for use in a helical screw compressor for compressing elastic working fluids and more particularly, to a low cost rotor formed of metal reinforced plastic.

2. Description of the Prior Art

Helical screw compressors are employed for compression of elastic working fluids, such as air or refrigerants in gaseous form, such helical rotary screw compressors consisting essentially of a housing defining laterally spaced and intersecting cylindrical bores within which two coplanar, cooperating rotors provided with helical lobes and grooves are mounted for intermeshed rotation. Generally, the rotors are male and female with the lobes of the male rotors having at least a major portion outside the pitch circle of the rotor and have substantially convex flanks with the lobes of the female rotor having at least their major portions inside the pitch circle of the rotor and having substantially concave flanks. Further, normally the female rotor is characterized by lobes which are relatively thin in comparison to the lobes of the male rotor. During rotation, the lobes of one rotor mesh with the groove of the cooperating rotor and normally, one rotor drives the other with the driving force transferred from the driving rotor lobe to the driven rotor lobe with the reaction force taken up thereby at rotor pitch diameter.

In general, particularly with large size helical screw compressors, the screw rotors have been machined from hardened steel which has been specially treated, and the manufacture of such rotors are complicated both by the cost of the metal stock material from which the rotors are machined and the expense in machining the rotors.

Attempts have been made to reduce the cost of the helical screw compressors by employing in smaller machines, rotors formed of plastic which may be molded in a two-part mold under conventional plastic molding techniques. While this has resulted in the production of small size helical screw rotors which are relatively inexpensive when compared to those machined of metal stock, these rotors do not stand up to extended use, and tend to wear or even to disintegrate because of the stresses acting on the relatively thin lobes, particularly those of the female rotor at pressures and temperatures normal to their operation.

SUMMARY OF THE INVENTION

The present invention is directed to an improved molded plastic helical screw compressor rotor which is metal reinforced. Axially spaced metal plates of disc form whose periphery is configured closely or otherwise to that of the finished rotor are fixedly stacked at longitudinally spaced positions on a rotor shaft to form a metal skeleton. The plastic jacket is molded completely about and between the metal plates to form a unitary molded plastic rotor.

The metal shaft is preferably provided with a helical keyway. The plates are of uniform configuration and include a central bore having a radial projection corresponding to the helical keyway of the shaft. In stacking the plates, they are circumferentially offset as determined by the projections within the helical keyway to produce an outline of the helical lobes having a given pitch. The plates may be welded or otherwise affixed to the rotor shaft. Alternatively, thin spacer rings having an inner diameter corresponding to the diameter of the rotor shaft may be stacked on the rotor shaft and interspersed between the plates to uniformly space the plates axially on the shaft. Preferably, each of the lobes of the metal plates have one or more openings within the same such that the material forming the plastic jacket not only covers the plates and extends between the plates, but fills the holes to further reinforce the encapsulated composite rotor.

The lobes of the plates are peripherally notched along their flanks, at the pitch line on one or both sides and hardened metal strips of predetermined cross section are suitably fixed within the notches at each plate to span the skeleton axially to provide a wear surface lying flush with the surface of the plastic after molding and finishing.

DESCRIPTION OF THE PREFERRED EMBODIMENT

Figure 1:
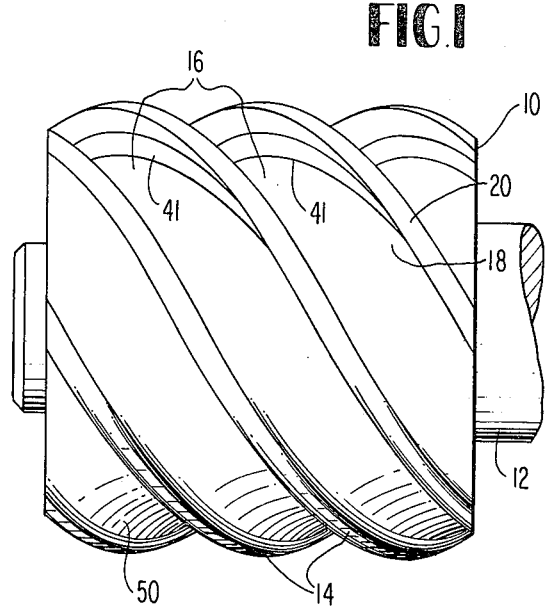
FIG. 1 is a side view of the metal reinforced plastic helical screw compressor rotor of the present invention.

The present invention has general application to the manufacture of gas and liquid rotary compressor rotors and more particularly to the manufacture of female or male helical screw compressor rotors. However, the invention is illustrated as being applied to a female helical screw rotor 10 which, as illustrated in FIG. 1, is concentrically fixed to shaft 12. The shaft is formed of metal, such as steel while the rotor itself has an outer skin or jacket of plastic or epoxy which impregnates an inner metal skeleton, more clearly seen in FIGS. 2, 3 and 4. The helical screw rotor 10 is formed such that its periphery is characterized by helical lobes 14 which define therebetween grooves 16 of generally concave configuration, the lobes 14 being relatively thin as the flanks 18 approach the tips 20 and the tips 20 being relatively flat.

Figure 2:
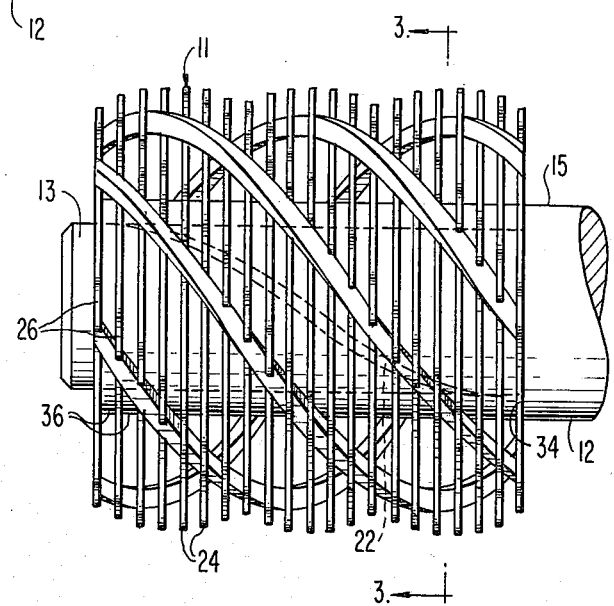
FIG. 2 is a side view of a portion of a rotor shaft supporting plates and the rotor skeleton prior to placement in a mold to form the rotor of FIG. 1.
Figure 3:
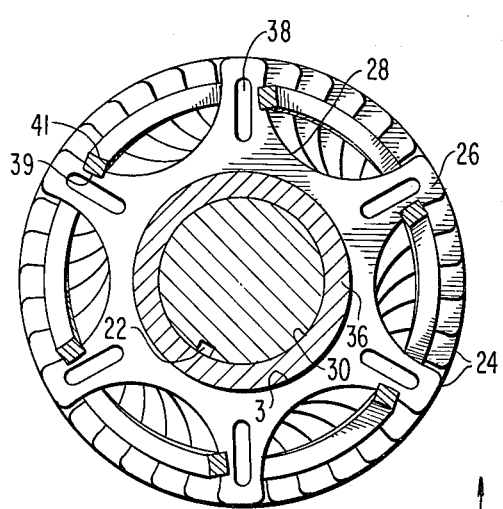
FIG. 3 is a sectional view of the skeleton of FIG. 2 taken about line 3—3.
Figure 4:
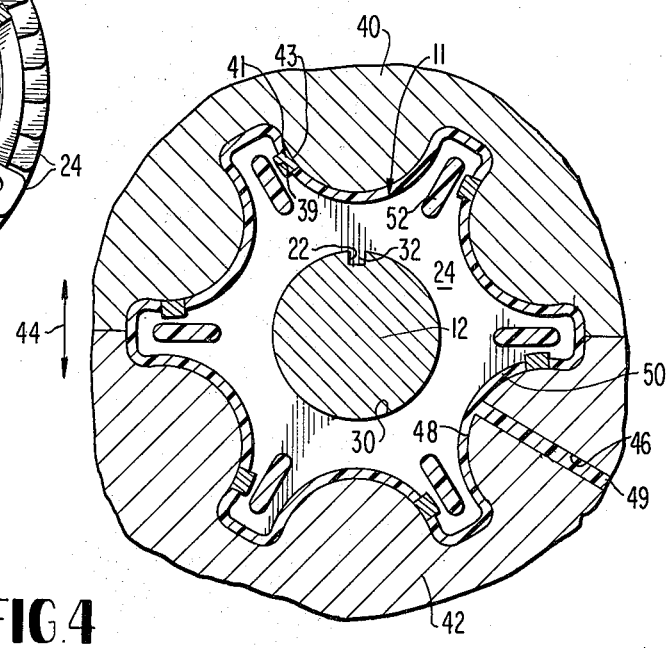
FIG. 4 is a sectional view of a two-part mold during molding of the rotor of FIG. 1 after the insertion of the skeleton of FIG. 2 therein.

The makeup and manufacturing process relative to the improved composite helical screw compressor rotor of the present invention may be best seen by further reference to FIGS. 2, 3 and 4. The shaft 12 is shown in those figures as having formed therein a helical keyway 22 which is generally rectangular in cross section, although the keyway may take other forms, such as keystone-shaped in cross section, as desired. However, the keyway 22 is provided with a pitch and therefore defines a wrap angle which is determinative of the ultimate configuration of the helical lobes 14 of the rotor 10. In this regard, as a principal aspect of the present invention, there are provided a plurality of metal plates or discs 24 whose outer periphery is configured in close conformance to the ultimate screw rotor profile, that is, each plate 24 is provided with a plurality of circumferentially spaced radial projections 26 with valleys 28 therebetween. The plates are bored or stamped to form a central opening 30 which is of a diameter on the order of the diameter of shaft section 13 so as to be slidably mounted thereon. To facilitate manufacture, the shaft 12 may be provided with a first section 13 having a diameter on the order of the bore or opening 30 within the metal plates 24 and a second section 15 of larger diameter which form shoulder 34 forming an end stop for the stacked array of metal plates 24 as they are slid onto the small diameter section 13 of the shaft. A radial projection or tab 32 is formed on each one of the plates 24 and is of a size and configuration conforming to the keyway 22 and fits therein. Since the keyway is helical about the periphery of the small diameter shaft section 13, the plates 24 as they move toward shoulder 34 rotate to conform to the helical keyway, and thus the projections of adjacent discs 24 are circumferentially offset from each other. Preferably, the array of plates 24 are axially spaced from each other uniformly by the use of thin metal spacer rings 36 having an internal diameter on the order of that of the small diameter shaft portion 13 and an outer diameter which may equal the diameter of the shaft section 15. The rings 36 are of equal thickness. Thus, as seen in FIGS. 2 and 3, the alternate placement of plates 24 and rings 36 create a skeleton with the small diameter end of the shaft 12 of the desired metal screw rotor profile. The mere stacking of the plates causes the projections 32 to automatically force the circumferential offsetting or fanning of the plates and therefore the helical configuration of the completed rotor may be readily seen from the sectional view of FIG. 3. Further, preferably each of the metal plates 24 are provided with elongated holes or openings 38 which extend radially the majority of the length of the lobes, permitting axial flow of plastic material which jackets the skeleton assembly 11 with the plates of FIGS. 2 and 3 during the molding process.

Additionally, each of the metal plates 24 may be provided with notches 39 within one or both flanks of each lobe at the rotor pitch line and preferably a hardened metal strip 41 is suitably fixed to each lobe by brazing within the notches of respective plates. The strips 41 therefore extend axially in helical fashion along one or both flanks of the rotor lobes. After completion of the molding process, the face 43 of the hardened metal strip 41 lies flush with the surface of the plastic jacket 50. If desired, strips 41 may be brazed or welded directly to the flanks of the lobes without the need of notches 39, in which case the strips would be thinner, with their thickness corresponding to that of the plastic layer overlying the metal plates 24. The provision of the strips 41 permits one rotor to directly drive the other with improved wearability.

In that regard, reference to FIG. 4 shows the finished rotor prior to removal from the mold, the mold consisting of an upper mold section 40 and a lower mold section 42 relatively movable as indicated by the arrow 44 to separate and permit the introduction of the skeleton assembly 11 and the removal of the molded rotor 10. One or more injection holes 46 are provided within the mold permitting liquid plastic to be injected under pressure within the mold cavity formed by mold walls 48. Prior to molding, the skeleton 11 is placed in position such that the shaft 12 which supports the axially spaced metal plates 24 thereon is positioned within the mold section such that the peripheral edges of the metal plates 24 do not touch the sidewalls 48 of the mold sections. The injection of plastic material 49 causes a jacket 50 of molded material to completely envelop the periphery of the metal plates 24 filling the spaces between the metal plates 24 and also filling the holes 38 so as to form helical reinforcing bars 52 throughout the length of the screw rotor 10. The jacket and reinforcing bars may be molded of suitable plastic, such as metal filled epoxy material, it being necessary only that the plastic jacket 50 has sufficient strength to withstand the heat and temperature to which it is subjected during compressor use, as well as being compatible with the working fluid of the compressor. Preferably, the spacing between the rotor plates 24 is on the order of ¼ to ⅜ inch. With the heat and/or pressure curable epoxy material 49 or its equivalent introduced under pressure into the mold cavity defined by wall 48, the material entirely encapsulates the skeleton assembly 11 filling all voids including the openings or holes 38, thus producing helical reinforcing bars 52 within the rotor lobes or lands. This results in a rotor structure having superior beam and torsional strength due to the metal skeleton while the plastic jacket is very rigid, is not subject to fracture due to the reinforcement by the metal skeleton and completely surrounds and extends through the perforated rotor plates 24.

While the invention has been particularly shown and described with reference to preferred embodiments thereof, it will be understood by those skilled in the art that the foregoing and other changes in form and details may be made therein without departing from the spirit and scope of the invention. Specifically, the present invention is applicable to straight lobe blower or pump rotors as well as the helical screw rotors of the illustrated embodiment.

What is claimed is:

1. A helical screw compressor rotor comprising:
   a central shaft,
   a plurality of metal plates fixedly stacked on said rotor shaft in concentric fashion at axially spaced positions to form a metal skeleton, said plates having an outer periphery configured generally to that of the finished helical screw compressor rotor profile and comprising helical lobes of given pitch, forming helical grooves therebetween, and a plastic jacket encapsulating said metal skeleton, and filling the spaces between said plates to rigidly connect said spaced plates together and form a unitary, light weight, solid rotor of high load bearing capability.

2. The helical screw compressor rotor as claimed in claim 1 wherein said plates have an outer periphery consisting of radially projecting lobes at spaced circumferential positions, a central opening corresponding to the diameter of the shaft carrying the same, said shaft includes a helical keyway within the periphery of the same and said plates are provided with radial tabs within said openings of similar size and configuration to and positioned within said keyway such that said plates are skewed in the manner defined by the helical keyway.

3. The helical screw compressor rotor as claimed in claim 1 further comprising spacer rings having an inner diameter on the order of the shaft, and being stacked on said shaft between said plates in alternating fashion with said plates for uniformly spacing said plates axially.

4. The helical screw compressor rotor as claimed in claim 2 further comprising spacer rings positioned having an inner diameter on the order of the shaft, and being stacked on said shaft between said plates in alternating fashion with said plates for uniformly spacing said plates axially.

5. The helical screw compressor rotor as claimed in claim 1 wherein the lobes of said plates carry at least one opening therein, and wherein said encapsulated plastic fills said openings to form helical reinforcing bars extending through said rotor from end to end at each lobe location.

6. The helical screw compressor rotor as claimed in claim 2 wherein the lobes of said plates carry at least one opening therein, and wherein said encapsulated plastic fills said openings to form helical reinforcing bars extending through said rotor from end to end at each lobe location.

7. The helical screw compressor rotor as claimed in claim 3 wherein the lobes of said plates carry at least one opening therein, and wherein said encapsulated of plastic fills said openings to form helical reinforcing bars extending through said rotor from end to end at each lobe location.

8. The helical screw compressor rotor as claimed in claim 4 wherein the lobes of said plates carry at least one opening therein, and wherein said encapsulated plastic fills said openings to form helical reinforcing bars extending through said rotor from end to end at each lobe location.

9. The helical screw compressor rotor as claimed in claim 5 wherein said openings are elongated radially and extend over a substantial radial extent of said lobes.

10. The helical screw compressor rotor as claimed in claim 6 wherein said openings are elongated radially and extend over a substantial radial extent of said lobes.

11. The helical screw compressor rotor as claimed in claim 7 wherein said openings are elongated radially and extend over a substantial radial extent of said lobes.

12. The helical screw compressor rotor as claimed in claim 8 wherein said openings are elongated radially and extend over a substantial radial extent of said lobes.

13. The helical screw compressor as claimed in claim 1, wherein hardened metal strips extend longitudinally along at least one of the flanks of the plate lobes with one surface thereof lying flush with said plastic jacket.

14. The helical screw compressor as claimed in claim 2, wherein hardened metal strips extend longitudinally along at least one of the flanks of the plate lobes with one surface thereof lying flush with said plastic jacket.

15. The helical screw compressor as claimed in claim 3, wherein hardened metal strips extend longitudinally along at least one of the flanks of the plate lobes with one surface thereof lying flush with said plastic jacket.

16. The helical screw compressor as claimed in claim 3, wherein hardened metal strips extend longitudinally along at least one of the flanks of the plate lobes with one surface thereof lying flush with said plastic jacket.

17. The helical screw compressor as claimed in claim 13, wherein: said lobes of said metal plates have notches formed within their flanks at each metal strip location and said strips are fixedly received within said notches.

18. The helical screw compressor as claimed in claim 16, wherein: said lobes of said metal plates have notches formed within their flanks at each metal strip location and said strips are fixedly received within said notches.

* * * * *